Jan. 4, 1966   D. WHITE   3,227,622
NUCLEAR REACTOR FUEL ELEMENTS
Filed May 27, 1963
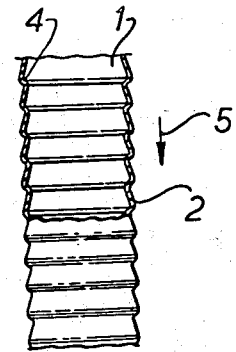

United States Patent Office 3,227,622
Patented Jan. 4, 1966

---

3,227,622
NUCLEAR REACTOR FUEL ELEMENTS
Douglas White, Fulwood, Preston, England, assignor to United Kingdom Atomic Energy Authority, London, England
Filed May 27, 1963, Ser. No. 283,466
Claims priority, application Great Britain, June 13, 1962, 22,801/62
2 Claims. (Cl. 176—73)

This invention relates to nuclear reactor fuel elements of the type comprising fissile material enclosed in a protective sheath.

Hitherto, gas cooled nuclear reactors of the Calder Hall type have employed fuel elements each comprising a uranium rod protectively enclosed in a magnesium alloy sheath but the operating temperature of such reactors is limited by the physical properties of these materials. In order to increase the heat rating of gas cooled nuclear reactors, elements have been designed comprising ceramic fissile material such as uranium dioxide enclosed in beryllium or stainless steel sheaths. Usually, each fuel element comprises cylindrical pellets of fissile material enclosed in a smooth surfaced cylindrical sheath but in use heat transfer and strength limitations have become evident. In order to achieve optimum heat transfer conditions between fuel and sheath it is necessary that the pellets have intimate contact with the sheath but yet in order to facilitate loading, a clearance must be allowed between the sheath and pellets. Final contacting is effected by external pressurising of the sheath but owing to the relatively large clearance and thinness of the sheath material the pressurising often results in longitudinal puckering with resultant weakness. Furthermore, in use in a nuclear reactor, relative movement between fuel and sheath known as ratcheting occurs on thermal cycling of the reactor, which cycling can also lead to weakening and eventual collapse of the sheath due to elastic instability thereof. Other causes of failure include plastic collapse and creep collapse. It has also been found desirable in some cases to form the exterior of the sheath with an irregular surface to increase the turbulence in the gas near the sheath surface and therefore heat transfer thereto.

It is an object of the present invention to provide an improved fuel element of the type comprising pellets of ceramic nuclear fuel enclosed in a protective sheath, in which fuel element the disadvantages hereinbefore described are largely overcome or reduced.

According to the invention, in a nuclear reactor fuel element of the type comprising a plurality of fuel members arranged end to end in a column, the column of fuel members being enclosed in a protective sheath, each fuel member being in the form of a body of generally truncated conical form.

The invention also consists in a nuclear reactor fuel of the type comprising a plurality of fuel members arranged end to end in a column, the column of fuel members being enclosed in a protective sheath, each fuel member being in the form of a body of generally truncated conical form and the protective sheath being deformed into intimate contact with the fuel members by external pressurising means.

An embodiment of the invention will now be described, by way of example, with reference to the sole figure of the accompanying drawing which is a fragmentary view of a fuel element partly in section.

In the figure there is shown a stack of fuel members in the form of ceramic pellets 1 of fissile material enclosed in a sheath 2. The pellets are of generally truncated conical form having a major diameter .380", minor diameter .360" and thickness .1". The pellets are produced by compacting uranium dioxide powder with a fugitive organic binder between dies followed by sintering at approximately 1650° C. The sheath 2 is of stainless steel having wall thickness .010" and, prior to loading of the pellets, is of cylindrical form. The pellets have been loaded into the sheath, end closures (not shown) have been applied and welded in position in leak-tight manner by conventional means, and the sheath deformed into intimate contact with the pellets by external pressurising of the sheath.

The pellets in a preferred form and as shown have chamfered corners 4 at the major diameter but may also be formed with rectangular, radiused or sharp corners. The chamfered, rectangular or radiused corners may be produced during the compacting step by suitable shaping of one of the dies, or by grinding after sintering. Accordingly, the external contours of the sheath after pressurising on to the pellets will comprise either a series of round edged or a series of sharper edged annular corrugations, depending on the shape of the pellets employed. The sharper edged corrugations are considered preferable from the point of view of optimum heat transfer between sheath and coolant. The direction of coolant flow over the fuel element as shown in the figure is preferably in the direction of the arrow 5.

The fuel element may for example be employed with other similar fuel elements to form the fuel rods of a fuel element assembly such as described in either our British Patent No. 873,073 or our British Patent No. 889,536.

In deciding the useful range over which the height to major diameter ratio and the difference between the major and minor diameter of the pellets 1 can be varied consideration should be given to the fact that the invention is directed to avoid the need to form an irregular surface on the sheath by removing excess material from a blank sheath, such as by grinding, machining or etching of the blank sheath, to leave the irregular surface. Previously blank sheaths of 0.4" inside diameter and 0.030" wall thickness have been ground, machined or etched to provide a sheath of 0.015" wall thickness with circumferential ridges of 0.015" width and height with 0.10" between ridges. The present invention is intended to cover pellets 1 of height to major diameter ratio in the range 1:4 to 1:2 and having a difference between major and minor diameters in the range 0.01" to 0.04".

I claim:
1. A nuclear reactor fuel element comprising a plurality of fuel pellets arranged end to end in a column, the column of fuel pellets being enclosed in a thin walled protective sheath, each fuel pellet being of turncated conical form, the minor and major end faces of adjacent fuel pellets in the column being in contact with each other, the major end faces of the pellets all being of equal diameter and the sheath having an external configuration conforming closely to the external shape of the column of fuel pellets.

2. A nuclear reactor fuel element as claimed in claim 1 wherein the height to major diameter ratio of the pellets is in the range 1:4 to 1:2 and the difference between the major and minor diameters of the pellets is in the range 0.010 inch to 0.040 inch.

References Cited by the Examiner

UNITED STATES PATENTS

| | | | |
|---|---|---|---|
| 2,992,179 | 7/1961 | Bassett | 176—74 |
| 3,009,869 | 11/1961 | Bassett | 176—74 X |
| 3,018,238 | 1/1962 | Layer et al. | 29—470.1 |
| 3,034,975 | 5/1962 | Beurtheret | 176—90 |
| 3,085,059 | 4/1963 | Burnham | 176—73 |
| 3,085,954 | 4/1963 | Stohr et al. | 176—73 |
| 3,092,901 | 6/1963 | Sharples | 29—520 |
| 3,096,264 | 7/1963 | Bauer | 176—81 |

FOREIGN PATENTS

| | | |
|---|---|---|
| 579,201 | 11/1959 | Belgium. |
| 1,212,200 | 10/1959 | France. |
| 789,257 | 1/1958 | Great Britain. |
| 800,397 | 8/1958 | Great Britain. |
| 884,969 | 12/1961 | Great Britain. |

BENJAMIN R. PADGETT, *Acting Primary Examiner.*

CARL D. QUARFORTH, *Examiner.*

R. C. LYNE, L. D. RUTLEDGE, J. V. MAY,
*Assistant Examiners.*